US008688561B2

(12) United States Patent
Khuong-Huu et al.

(10) Patent No.: US 8,688,561 B2
(45) Date of Patent: *Apr. 1, 2014

(54) SYSTEM AND METHOD FOR AUTOMATIC DEFEASANCE OF A BASE PORTFOLIO OF SWAPS

(71) Applicants: Philippe Khuong-Huu, New York, NY (US); Jean-Pierre Lardy, Limoges (FR); Christian Daher, New York, NY (US)

(72) Inventors: Philippe Khuong-Huu, New York, NY (US); Jean-Pierre Lardy, Limoges (FR); Christian Daher, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/914,255

(22) Filed: Jun. 10, 2013

(65) Prior Publication Data

US 2013/0275340 A1    Oct. 17, 2013

Related U.S. Application Data

(63) Continuation of application No. 12/472,008, filed on May 26, 2009, now Pat. No. 8,463,684.

(60) Provisional application No. 61/056,683, filed on May 28, 2008.

(51) Int. Cl.
*G06Q 40/04*   (2012.01)

(52) U.S. Cl.
CPC .................... *G06Q 40/04* (2013.01)
USPC ............................................ 705/36 R; 705/37

(58) Field of Classification Search
USPC ................................ 705/36 R, 37
See application file for complete search history.

(56) References Cited

U.S. PATENT DOCUMENTS

| 2005/0149428 A1* | 7/2005 | Gooch et al. ............... 705/37 |
| 2006/0224491 A1* | 10/2006 | Pinkava ..................... 705/37 |
| 2008/0215430 A1* | 9/2008 | Ellis et al. ................. 705/14 |
| 2010/0036757 A1* | 2/2010 | Patterson et al. ........... 705/30 |

* cited by examiner

*Primary Examiner* — Kirsten Apple
*Assistant Examiner* — Joan Goodbody
(74) *Attorney, Agent, or Firm* — Amster, Rothstein & Ebenstein LLP

(57) ABSTRACT

A computer-implemented method for automatic defeasance of a base portfolio of swaps, the base portfolio being held between a first counterpart and a second counterpart, including the steps of: receiving at a portfolio database trade data related to the base portfolio; identifying from the trade data at a matching engine trades that have at least one of matching core attributes and matching trade characteristics so as to compile the base portfolio; grouping at a sub-portfolio generator the identified trades into sub-portfolios; determining at a spread value engine a set of allowable spread values for each sub-portfolio; and for each sub-portfolio, generating at a defeasance portfolio engine a defeasance portfolio of swaps comprising at the most two trades, each of the two trades having a spread value selected from the determined set of allowable spread values so that the defeasance portfolio replicates the base portfolio and minimizes gross notional of the defeasance portfolio.

12 Claims, 2 Drawing Sheets

SYSTEM AND METHOD FOR AUTOMATIC DEFEASANCE OF A BASE PORTFOLIO OF SWAPS

RELATED APPLICATION

This application is a continuation of U.S. patent application Ser. No. 12/472,008, filed May 26, 2009, which is based on U.S. Provisional Patent Application Ser. No. 61/056,683, filed May 28, 2008, the contents of which are incorporated herein in their entirety.

FIELD OF THE INVENTION

The present invention relates to a computer system and computer system-implemented method for defeasance of a financial investment portfolio, and in particular to automatic defeasance of a portfolio of credit default swaps.

SUMMARY OF THE INVENTION

A computer-implemented method for automatic defeasance of a base portfolio of credit default swaps according to an exemplary embodiment of the present invention, where the base portfolio is held between a first counterparty and a second counterparty, comprises the steps of: receiving at a portfolio database trade data related to the base portfolio; identifying from the trade data at a matching engine trades that have at least one of matching core attributes and matching trade characteristics so as to compile the base portfolio; grouping at a sub-portfolio generator the identified trades into sub-portfolios; determining at a spread value engine a set of allowable spread values for each sub-portfolio; and for each sub-portfolio, generating at a defeasance portfolio engine a defeasance portfolio of credit default swaps comprising at the most two trades, each of the two trades having a spread value selected from the determined set of allowable spread values so that the defeasance portfolio replicates the base portfolio and minimizes gross notional of the defeasance portfolio.

A system for automatic defeasance of a base portfolio of credit default swaps according to an exemplary embodiment of the present invention, where the base portfolio is held between a first counterparty and a second counterparty, comprises: a portfolio database that receives trade data related to the base portfolio; a trade matching engine that identifies trades from the trade data that have at least one of matching core attributes and matching trade characteristics so as to compile the base portfolio; a sub-portfolio generator that groups the identified trades into sub-portfolios of the base portfolio; a spread value engine that determines a set of allowable spread values for each sub-portfolio; and a defeasance portfolio engine that, for each sub-portfolio, generates a defeasance portfolio of credit default swaps comprising at the most two trades, each of the two trades having a spread value selected from the determined set of allowable spread values so that the defeasance portfolio replicates the base portfolio and minimizes gross notional of the defeasance portfolio.

According to an exemplary embodiment of the present invention, a computer system comprises one or more processors, one or more communication devices operatively connected to the one or more processors, and one or more computer media, the computer media containing instructions executable on the one or more processors for performing a method for automatic defeasance of a base portfolio of credit default swaps, the base portfolio being held between a first counterparty and a second counterparty, and the method comprises the steps of: receiving at a portfolio database trade data related to the base portfolio; identifying from the trade data at a matching engine trades that have at least one of matching core attributes and matching trade characteristics so as to compile the base portfolio; grouping at a sub-portfolio generator the identified trades into sub-portfolios of the base portfolio; determining at a spread value engine a set of allowable spread values for each sub-portfolio; and for each sub-portfolio, generating at a defeasance portfolio engine a defeasance portfolio of credit default swaps comprising at the most two trades, each of the two trades having a spread value selected from the determined set of allowable spread values so that the defeasance portfolio replicates the base portfolio and minimizes gross notional of the defeasance portfolio.

In at least one embodiment, the matching core attributes comprise at least one of the following types of core attributes: trade date, side, nominal, underlying name, maturity and currency.

In at least one embodiment, the matching trade characteristics comprise at least one of the following types of trade characteristics: effective date, fixed leg, contingent leg and calculation agent.

In at least one embodiment, the step of determining a set of allowable spread values comprises selecting spread values from two or more predetermined spread values.

In at least one embodiment, the step of determining a set of allowable spread values comprises selecting two predetermined spread values.

In at least one embodiment, the step of determining a set of allowable spread values comprises selecting spread values that correspond to recognized standard spread values.

In at least one embodiment, the predetermined spread values comprise two or more of the following spread values: 10 bp, 25 bp, 50 bp, 100 bp, 250 bp, 500 bp and 1000 bp.

In at least one embodiment, the step of determining a set of allowable spread values comprises selecting spread values that are greater than or equal to a maximum of the following: (i) the predetermined spread value immediately preceding or equal to a minimum executed spread on the base portfolio, and (ii) 50% of an average spread of the base portfolio.

In at least one embodiment, the step of determining a set of allowable spread values comprises selecting spread values that are less than or equal to the minimum of the following: (i) the predetermined spread value immediately following or equal to a maximum executed spread on the base portfolio, and (ii) 200% of an average spread of the base portfolio.

In at least one embodiment, the step of generating a defeasance portfolio comprises, for each sub-portfolio, confirming at a verification engine one or more of the following: the defeasance portfolio has a maximum of two trades, novation of the defeasance portfolio and termination of the base portfolio does not generate payments, and the defeasance portfolio minimizes gross notional.

A computer-implemented method for automatic defeasance of a base portfolio of credit default swaps, where the base portfolio is held between a first counterpart and a second counterpart, comprises the steps of: sending first signals related to registration data of the first and second counterparts to a defeasance portfolio service provider computer system; sending second signals related to a defeasance date selected by the first and second counterparts to the defeasance portfolio service provider computer system; on the defeasance date, sending third signals related to the base portfolio to the defeasance portfolio service provider computer system; receiving from the defeasance portfolio service provider fourth signals related to a request to accept a proposed reconciliation of the base portfolio computer system; receiving from the defeasance portfolio service provider fifth signals related to a request to accept a proposed defeasance of the base portfolio into a defeasance portfolio using the accepted proposed reconciliation computer system; and receiving from the defeasance portfolio service provider computer system sixth signals related to a request to confirm defeasance of the base portfolio into a defeasance portfolio using the accepted proposed defeasance.

A computer-implemented method for automatic defeasance of a base portfolio of credit fault swaps, where the base portfolio is held between a first counterparty and a second counterparty, comprises the steps of: receiving at a defeasance portfolio service provider computer system first signals related to registration data of the first and second counterparties; receiving at the defeasance portfolio service provider computer system second signals related to a defeasance date selected by the first and second counterparties; on the defeasance date, receiving at the defeasance portfolio service provider computer system third signals related to the base portfolio; sending from the defeasance portfolio service provider computer system to the first and second counterparties fourth signals related to a request to accept a proposed reconciliation of the base portfolio; sending from the defeasance portfolio service provider computer system to the first and second counterparties fifth signals related to a request to accept a proposed defeasance of the base portfolio into a defeasance portfolio using the accepted proposed reconciliation; and sending from the defeasance portfolio service provider computer system to the first and second counterparties sixth signals related to a request to confirm defeasance of the base portfolio into a defeasance portfolio using the accepted proposed defeasance.

In at least one embodiment, the proposed reconciliation of the base portfolio is generated by identifying trades within the base portfolio that have at least one of matching core attributes and matching trade characteristics.

In at least one embodiment, the proposed defeasance is generated by grouping trades within the base portfolio into sub-portfolios, determining a set of allowable spread values for each sub-portfolio and, for each sub-portfolio, generating a defeasance portfolio of credit fault swaps comprising at the most two trades, each of the two trades having a spread value selected from the determined set of allowable spread values so that the defeasance portfolio replicates the base portfolio and minimizes gross notional of the defeasance portfolio.

In at least one embodiment, the request to confirm defeasance of the base portfolio comprises data relating to confirmation of one or more of the following: the defeasance portfolio has a maximum of two trades, novation of the defeasance portfolio and termination of the base portfolio does not generate payments, and the defeasance portfolio minimizes gross notional.

In at least one embodiment, the defeasance service provider is an application service provider providing services over a network.

In at least one embodiment, the registration data comprises cut-off dates and transaction currencies.

BRIEF DESCRIPTION OF THE DRAWINGS

The above and related objects, features and advantages of the present invention will be more fully understood by reference to the following, detailed description of the preferred, albeit illustrative, embodiment of the present invention when taken in conjunction with the accompanying figures, wherein.

DETAIL DESCRIPTION OF THE PREFERRED EMBODIMENT(S)

Figure 1:
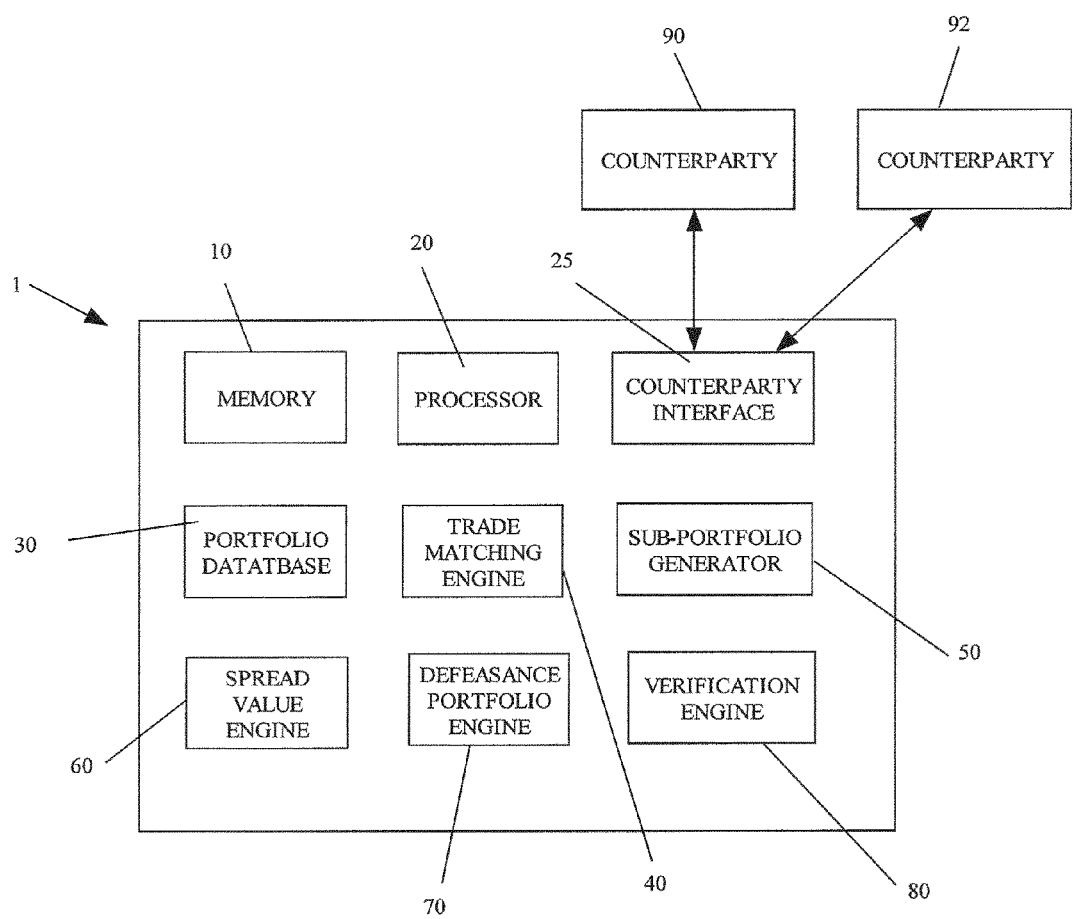
FIG. 1 is a block diagram of a system for automatic defeasance of a base portfolio of credit default swaps according to an exemplary embodiment of the present invention.

The present invention is directed to a system and method for the automatic defeasance of a portfolio of an arbitrary number of credit default swaps ("CDSs") into a reduced portfolio of CDSs with at most two spread values. In various exemplary embodiments, the spread values are selected to optimally reduce the gross notional of the defeased portfolio.

As is known in the art of financial investments, a CDS is a kind of insurance against credit risk, and is a privately negotiated bilateral contract between two counterparties. The buyer of protection pays a fixed fee or premium to the seller of protection for a period of time and if a certain pre-specified "credit event" occurs, the protection seller pays compensation to the protection buyer. A "credit event" may be, for example, a bankruptcy of a company, called the "reference entity", or a default of a bond or other debt issued by the reference entity. If no credit event occurs during the term of the swap, the protection buyer continues to pay the premium until maturity. Thus, a CDS is made up of a "fixed leg" of periodic payments made by the buyer of protection and a "contingent leg" of one payment made by the seller of protection if the reference credit defaults. The premium paid by the protection buyer to the seller, often called "spread", is quoted in basis points per annum ("bps") of the contract's notional value, and is typically paid quarterly.

In the present description, the term "base portfolio" refers to a portfolio of CDSs negotiated between two counterparties. The base portfolio may be represented by two separate portfolios, where each portfolio corresponds to data related to the CDSs within the base portfolio as collected separately by the two counterparties. Thus, for each CDS, the buyer counterparty may have purchase data in its portfolio, and the seller counterparty may have sales data in its portfolio. Also, in the present description, the base portfolio may refer to a single portfolio including data collected from both counterparties. The separate portfolios of the counterparties may be held on a confidential basis.

Also, in the present description, the term "defeasance portfolio" refers to a portfolio generated based on the base portfolio having at the most two trades, where each of the trades in the defeasance portfolio has a spread value selected from a determined set of allowed spread values so that the defeasance portfolio replicates the base portfolio and minimizes gross notional of the defeasance portfolio.

The counterparties involved in the base and defeasance portfolios of the present invention may be any type of entity, such as, for example, commercial banks, insurance companies, financial guarantors and global hedge funds. Further, the reference entities for the CDSs in the portfolios may be any type of entity, such as, for example, corporations and sovereign names.

In various exemplary embodiments of the present invention, the CDS contracts within the base portfolio are not limited to a particular notional value, and may have, for example, notional values within the range of $10 million to $20 million, or notional values that are outside this range. The CDS contracts may have the same or different notional values. Further, the pricing of the individual CDS contracts may be based on any number and variety of suitable parameters, such as, for example, the likelihood of default, the recovery rate when default occurs, and consideration for liquidity, regulatory, and market sentiment about the credit. Also, the CDS contracts may have any suitable maturity, such as, for example, a maturity within the range of one to ten years, or a maturity outside this range. The CDS contracts may have the same or different maturities.

FIG. 1 is a block diagram of a system, generally designated by reference number 1, for automatic defeasance of a base portfolio of CDSs according to an exemplary embodiment of the present invention. The system 1 includes a memory 10, a processor 20, a counterparty interface 25, a portfolio database 30, a trade matching engine 40, a sub-portfolio generator 50, a spread value engine 60, a defeasance portfolio engine 70 and a verification engine 80. The counterparty interface 25, portfolio database 30, trade matching engine 40, sub-portfolio generator 50, spread value engine 60, defeasance portfolio engine 70 and verification engine 80 may be composed of software components running on the processor 20, a plurality of separate hardware components or a single hardware component, or a combination of hardware and software components.

The counterparty interface 25 may include a graphical user interface or some other type of electronic interface that allows the counterparties 90, 92 to communicate with the system 1. The counterparty interface 25 may be located remotely from the other system components and be in communication via a local area network (LAN), such as an intranet, or a wide area network (WAN), such as the Internet. Alternatively, the counterparty interface 25 may be integrated locally to the other components of the system 1. The counterparty interface 25 may provide a series of fields to be filled in by the counterparties to allow the counterparties to provide data to the system 1. For example, the counterparty interface 25 may include a wizard, including a series of dropdown menus, that assist the counterparties 90, 92 in filling in correct and complete information within the fields.

In at least one exemplary embodiment of the present invention, the counterparties are prompted to fill in registration data at the counterparty interface 25. For example, the counterparty interface 25 may request data related to the names and other identifying information related to the counterparties, data related to an agreed-upon defeasance date and time, data related to specified cut-off dates, and data related to transaction currencies. In general, the registration data may provide information to allow the system 1 to identify the counterparties upon signing on to the system 1, as well as general information regarding the defeasance of the base portfolio between the counterparties.

The portfolio database 30 receives and stores information related to the base portfolio. In this regard, each counterparty may send data related to the base portfolio to the portfolio database 30 through the counterparty interface 25. In an exemplary embodiment of the invention, the counterparty interface 25 allows each counterparty to upload its individual view of the base portfolio, on a confidential basis, to the portfolio database 30 within a time window leading up to the agreed-upon defeasance time. The time window may open, for example, one or more hours before the defeasance time, and the duration of the time window may be pre-set either by the counterparties or automatically by the system 1.

The trade matching engine 40 reviews and analyzes the two different views of the base portfolio as received by the two counterparties. In this regard, the trade matching engine 40 may verify certain information related to the trades within the base portfolio. For example, the trade matching engine 40 may verify trade cut-off dates, whether the trades have confirmed status, and whether the reference data is valid. The trade matching engine 40 may also sort the trades in a certain sequence, for example, first by chronological order, then by underlying name, and then by nominal amounts, or in some other suitable sequence. After verification and sequential ordering of the trades, the trade matching engine 40 may then match all the trades of the counterparties portfolios line by line into one base portfolio of bilateral trades. In this regard, the matching process may review and match trade details by order of economic importance based on core attributes, such as, for example, trade date, side, nominal amount, underlying name, maturity, and currency, to name a few, and/or trade characteristics, such as, for example, effective date, fixed leg (payment and convention), contingent leg (credit events, borrowed money, deliverable obligations, etc.), and calculation agent, to name a few.

After the matching process, if trades remain unmatched, the trade matching engine 40 may generate a report for each counterparty identifying the unmatched trades. In this regard, an error code may be generated that indicates the reason for the error, such as, for example, a message indicating that there is no corresponding trade with matching core attributes, or a trade reconciled on core attributes does not match on trade characteristics. If all trades are matched, the base portfolio of bilateral trades may be made available for viewing by the counterparties through the counterparty interface 25.

The sub-portfolio generator 50 partitions the base portfolio compiled by the trade matching engine 40 into sub-portfolios of CDSs having matching characteristics. For example, each sub-portfolio may have CDSs that have the same currency, underlying name, maturity and credit event.

The spread value engine 60 determines a set of allowable spread values for each sub-portfolio compiled by the sub-portfolio generator 50. The allowable spread values may be determined according to one or more constraints, such as, for example, the allowable spread values must be selected from a set of predetermined spread values, the allowable spread values must be greater than or equal to the maximum of (i) the predetermined spread value from the set of predetermined spread values that immediately precedes or is equal to the minimum executed spread in the base portfolio, and (ii) 50% of the average spread of the base portfolio, and the allowable spread values must be less than or equal to the minimum of (i) the predetermined spread value from the set of predetermined spread values immediately following or equal to the maximum executed spread in the base portfolio, and (ii) 200% of the average spread of the base portfolio. Any other suitable constraints, including constraints based on any percentage of average spread values within the base portfolio, may be used. The set of predetermined spread values may include, for example, 10 bps, 25 bps, 50 bps, 100 bps, 250 bps, 500 bps and 1000 bps, or any other predetermined spread value.

In an exemplary embodiment of the present invention, the allowable spread values may be set to recognized standard spread values. Such spread values may be recognized by, for example, central clearing exchanges for CDSs that have adopted a standard coupon rate fixed to two levels (e.g., 100 bps and 500 bps, 50 bps and 100 bps, 500 bps and 1000 bps, etc.). The spread value engine 60 may automatically select the two standard spread values as the set of predetermined spread values. Alternatively, the two counterparties may agree to choose the two standard spread values as the set of predetermined spread values.

The defeasance portfolio engine 70 generates for each sub-portfolio a defeasance portfolio of CDSs including at the most two trades, each of the two trades having a spread value selected from the determined set of allowable spread values so that the defeasance portfolio replicates the base portfolio and the gross notional of the defeasance portfolio is minimized. The defeasance portfolio engine 70 may use any suitable algorithm to determine the optimal spread value and notional for each of the two trades. In at least one exemplary embodiment of the present invention, the defeasance portfolio engine 70 may use the following algorithm for each sub-portfolio:

Starting from a sub-portfolio consisting of a number N of CDSs labeled i=1, ..., N, with notional $N_i$ (with $N_i>0$ for "long protection", $N_i<0$ for "short protection") and spread $S_i$, all maturing on the same roll date T, compute the net notional of the original portfolio $$\overline{N} = \sum_{i=1,...,N} N_i$$

by summing the notionals (with corresponding +/−sign), the net dollar spread of the original portfolio $$\overline{SN} = \sum_{i=1,...,N} S_i N_i$$

by summing the dollar spreads (with corresponding +/−sign). Then, iterate across all combinations of the following: for all sets of two allowable spread values $S_1$ and $S_2$, taken such that $S_1$ and $S_2$ are different, calculate the corresponding notionals $N_1$ and $N_2$ of defeasing trades, according to the formulae $$N_1 = \frac{S_2\overline{N} - \overline{SN}}{S_2 - S_1} \text{ and } N_2 = -\frac{S_1\overline{N} - \overline{SN}}{S_1 - S_2},$$

where a positive result is a "long protection", a negative result is a "short protection" and a null result indicates that no CDS is required for defeasance. For each iteration of sets of two allowable spread values $S_1$ and $S_2$, the gross notional $N_{gross}=|N_1|+|N_2|$ (equal to the sum of the absolute values of the notionals of the defeasing trades) is calculated and recorded. After this iteration, the two trades having corresponding spread values S1, S2 and corresponding notionals N1,N2 that result in the smallest gross notional $N_{gross}$ are retained.

Note that in the above algorithm, if N=1 (i.e., in the case of a single CDS), the defeasance portfolio engine 70 may generate a defeasance portfolio of CDSs made up of two trades. In this situation, if the predetermined spread values are selected so as to correspond to the standard spread values mentioned above, the single CDS may be defeased into two trades, where each of the two trades may have a corresponding spread value selected from the standard spread values. The notional of the two defeasance trades may be of the same sign of the notional of the single CDS if the single CDS spread value is not outside of the range of two standard spread values.

In an exemplary embodiment of the present invention, the system 1 may be used for automatic defeasance of a base portfolio of CDSs so that the base portfolio may be transferred from one exchange to another. This may be particularly useful in the case in which exchanges and or conventions within various geographical regions (e.g., U.S., Europe, Asia) select different standard coupon rates. For example, a base portfolio in Exchange A having standard spread values may be transferred to Exchange B having different standard spread values by automatic defeasance of the base portfolio so that the resulting defeasance portfolio is made up of trades having corresponding spread values that are appropriate for Exchange B.

The verification engine 80 may confirm that the defeasance portfolio having at the most two trades provides the necessary results. For example, the verification engine 80 may confirm that the defeasance portfolio has a maximum of two trades, the novation of the defeasance portfolio together with the termination of the base portfolio generates neither fixed not contingent payments for any party, and the alternative defeasance portfolios have a greater gross notional (i.e., the defeasance portfolio results in the smallest gross notional).

The following example illustrates a computer-implemented method for automatic defeasance of a base portfolio of credit default swaps according to an exemplary embodiment of the present invention:

EXAMPLE 1

Figure 2:
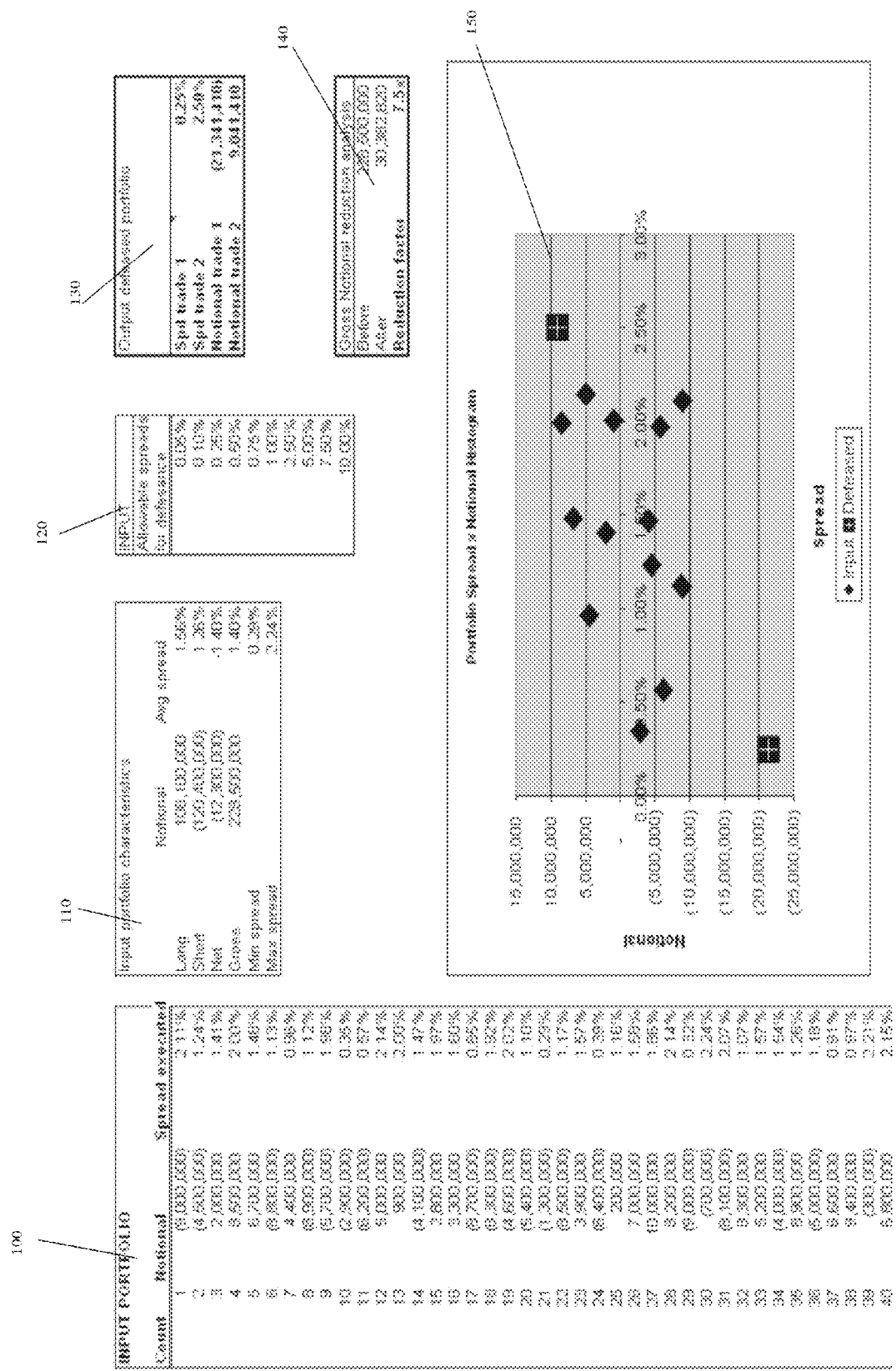
FIG. 2 shows the various exemplary calculations made in accordance with an embodiment of the present invention shown in Example 1.

As shown in FIG. 2, a sub-portfolio of a base portfolio compiled by data received from two counterparties is received as input to the system 1. The sub-portfolio is represented by the sub-portfolio data table 100 in FIG. 2, which includes information regarding each of the trades within the sub-portfolio 100. In this regard, within the sub-portfolio table 100, each trade may be identified by a "count", and information such as "notional" and "executed spread" may be included in the sub-portfolio table 100 for each trade. As shown in the sub-portfolio characteristics table 110, the overall characteristics of the sub-portfolio is automatically compiled. The characteristics of the sub-portfolio listed in the sub-portfolio characteristics table 110 includes the average spread and summed notionals for all long trades, the average spread and summed notionals for all short trades, the net average spread and net notional for all trades, the gross average spread and gross notional for all trades, the minimum spread and the maximum spread. A set of allowable spread values for each defeasance portfolio is then determined based on the characteristic data as provided in the sub-portfolio characteristic table 110. The set of allowable spread values is provided in the allowable spreads table 120. As shown in the defeasance portfolio table 130, the sub-portfolio is reduced to a defeasance portfolio composed of two trades, each trade having a corresponding spread selected from the set of allowable spreads and a corresponding notional so that the gross notional of the defeasance portfolio is minimized. As shown in the analysis table 140, a reduction analysis is performed for the defeasance portfolio to determine the reduction factor of the defeasance portfolio. After iterating through the above steps for each sub-portfolio of the base portfolio, a portfolio spread X notional histogram 150 is generated showing the spread and notional data of each sub-portfolio as compared to the spread and notional data of the defeasance portfolio.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims and not by the foregoing specification.

What is claimed is:

1. A computer-implemented method for automatic defeasance of a base portfolio of negotiated swaps, the base portfolio being held between a first counterparty and a second counterparty, comprising the steps of:

receiving at a portfolio database negotiated trade data related to the base portfolio;

identifying from the negotiated trade data at a matching engine using one or more processors negotiated trades that have at least one of matching core attributes and matching trade characteristics so as to compile the base portfolio;

grouping at a sub-portfolio generator using one or more processors the identified negotiated trades into sub-portfolios;

determining at a spread value engine using one or more processors a set of allowable spread values for each sub-portfolio; and for each sub-portfolio, generating at a defeasance portfolio engine using one or more processors a defeasance portfolio of swaps comprising at the most two trades, each of the two trades having a spread value selected from the determined set of allowable spread values so that the defeasance portfolio replicates the base portfolio and minimizes gross notional of the defeasance portfolio.

2. The method of claim 1, wherein the matching core attributes comprise at least one of the following types of core attributes: trade date, side, nominal, underlying reference, maturity and currency.

3. The method of claim 1, wherein the matching trade characteristics comprise at least one of the following types of trade characteristics: effective date, fixed leg, variable leg and calculation agent.

4. The method of claim 1, wherein the step of determining a set of allowable spread values comprises selecting using one or more processors spread values from two or more predetermined spread values.

5. The method of claim 4, wherein the step of determining a set of allowable spread values comprises selecting using one or more processors spread values that are greater than or equal to a maximum of the following: (i) the predetermined spread value immediately preceding or equal to a minimum executed spread on the base portfolio, and (ii) 50% of an average spread of the base portfolio.

6. The method of claim 4, wherein the step of determining a set of allowable spread values comprises selecting using one or more processors spread values that are less than or equal to the minimum of the following: (i) the predetermined spread value immediately following or equal to a maximum executed spread on the base portfolio, and (ii) 200% of an average spread of the base portfolio.

7. The method of claim 4, wherein the step of determining a set of allowable spread values comprises selecting using one or more processors spread values that correspond to recognized standard spread values.

8. The method of claim 7, wherein the step of determining a set of allowable spread values comprises selecting using one or more processors two predetermined spread values.

9. The method of claim 1, wherein the step of generating a defeasance portfolio comprises, for each sub-portfolio, confirming at a verification engine using one or more processors one or more of the following: the defeasance portfolio has a maximum of two trades, novation of the defeasance portfolio and termination of the base portfolio does not generate payments, and the defeasance portfolio minimizes gross notional.

10. The method of claim 1, further comprising the step of transferring the defeasance portfolio from a first exchange to a second exchange.

11. The method of claim 1, wherein the step of generating a defeasance portfolio is performed using the following algorithm:

starting from a sub-portfolio consisting of a number N of swaps labeled i=1 . . . , N, with notional $N_1$ (with $N_1 > 0$ for "payer of the spread", $N_1 < 0$ for "receiver of the spread") and spread $S_i$, all maturing on the same roll date T, compute the net notional of the original portfolio $$\overline{N} = \sum_{i=1,\ldots,N} N_i$$

by summing the notionals (with corresponding +/−sign), the net dollar spread of the original portfolio $$\overline{SN} = \sum_{i=1,\ldots,N} S_i N_i$$

by summing the dollar spreads (with corresponding +/−sign);

iterate across all combinations of the following: for all sets of two allowable spread values $S_1$ and $S_2$, taken such that $S_1$ and $S_2$ are different, calculate the corresponding notionals $N_1$ and $N_2$ of defeasing trades, according to the formulae $$N_1 = \frac{S_2 \overline{N} - \overline{SN}}{S_2 - S_1} \text{ and } N_2 = -\frac{S_1 \overline{N} - \overline{SN}}{S_1 - S_2},$$

where a positive result is a "payer of the spread", a negative result is a "receiver of the spread" and a null result indicates that no swap is required for defeasance;

for each iteration of sets of two allowable spread values $S_1$ and $S_2$, the gross notional $N_{gross} = |N_1| + |N_2|$ (equal to the sum of the absolute values of the notionals of the defeasing trades) is calculated and recorded;

after the iteration, the two trades having corresponding spread values S1, S2 and corresponding notionals N1, N2 that result in the smallest gross notional $N_{gross}$ are retained.

12. A computer system comprising:

one or more processors;

one or more communication devices operatively connected to the one or more processors; and one or more computer-readable media containing computer-readable instructions executable on the one or more processors, the instructions being related to performance of a method for automatic defeasance of a base portfolio of negotiated swaps, the base portfolio being held between a first counterparty and a second counterparty, comprising the steps of:

receiving at a portfolio database negotiated trade data related to the base portfolio of negotiated swaps;

identifying from the trade data at a matching engine negotiated trades that have at least one of matching core attributes and matching trade characteristics so as to compile the base portfolio;

grouping at a sub-portfolio generator the identified negotiated trades into sub-portfolios;

determining at a spread value engine a set of allowable spread values for each sub-portfolio; and for each sub-portfolio, generating at a defeasance portfolio engine a defeasance portfolio of swaps comprising at the most two trades, each of the two trades having a spread value selected from the determined set of allowable spread values so that the defeasance portfolio replicates the base portfolio and minimizes gross notional of the defeasance portfolio.

\* \* \* \* \*